United States Patent
Yu et al.

(10) Patent No.: US 11,330,457 B2
(45) Date of Patent: May 10, 2022

(54) METHOD FOR BEAM MANAGEMENT WITH BEAM INDICATION IN WIRELESS COMMUNICATION SYSTEMS WITH BEAMFORMING

(71) Applicant: MEDIATEK INC., Hsinchu (TW)

(72) Inventors: Chia-Hao Yu, Hsinchu (TW); Ming-Po Chang, Hsinchu (TW); Jiann-Ching Guey, Hsinchu (TW)

(73) Assignee: MediaTek INC., Hsin-Chu (TW)

( * ) Notice: Subject to any disclaimer, the term of this patent is extended or adjusted under 35 U.S.C. 154(b) by 109 days.

(21) Appl. No.: 16/043,760

(22) Filed: Jul. 24, 2018

(65) Prior Publication Data

US 2019/0037426 A1   Jan. 31, 2019

Related U.S. Application Data

(60) Provisional application No. 62/536,509, filed on Jul. 25, 2017.

(51) Int. Cl.
*H04W 24/10*   (2009.01)
*H04L 5/00*   (2006.01)
(Continued)

(52) U.S. Cl.
CPC .......... *H04W 24/10* (2013.01); *H04L 5/0048* (2013.01); *H04W 16/28* (2013.01);
(Continued)

(58) Field of Classification Search
CPC ..... H04B 7/0695; H04B 7/088; H04L 5/0048; H04W 16/28; H04W 24/10; H04W 72/042; H04W 72/046; H04W 72/085
(Continued)

(56) References Cited

U.S. PATENT DOCUMENTS

2014/0177561 A1\* 6/2014 Yu .................. H04W 72/042
370/329
2017/0195033 A1   7/2017 Zhang et al.
(Continued)

FOREIGN PATENT DOCUMENTS

EP          3188548 A1     9/2014
WO    WO2016157059 A1    3/2015
(Continued)

OTHER PUBLICATIONS

Taiwan IPO, office action for the TW patent application 107125705 (no English translation is available) dated Jul. 18, 2019 (6 pages).
(Continued)

*Primary Examiner* — Pankaj Kumar
*Assistant Examiner* — Kokou R Detse
(74) *Attorney, Agent, or Firm* — Imperium Patent Works; Zheng Jin

(57) ABSTRACT

A beam indication (BI) mechanism is proposed to provide user equipment (UE) information of network (NW) beam(s) for later transmission. UE can then select its UE beam(s) for the later transmission based on the BI. In one embodiment, NW provides beam management configuration to UE via Radio Resource Control (RRC) signaling, and then provides beam indication index signaling to UE via MAC-CE or DCI. The beam management configuration comprises a mapping table between network beams and configured reference signal (RS) resources. The beam indication index signaling indicates one or more preferred beam pair links (BPLs). Upon triggering a beam management procedure by the network, UE is able to identify the beam management procedure and selects corresponding UE beam(s) based on the beam management configuration and the beam indication index signaling.

20 Claims, 5 Drawing Sheets

(51) Int. Cl.
*H04W 16/28* (2009.01)
*H04W 72/04* (2009.01)
*H04W 72/08* (2009.01)
H04B 7/08 (2006.01)
H04B 7/06 (2006.01)

(52) U.S. Cl.
CPC ....... *H04W 72/042* (2013.01); *H04W 72/046* (2013.01); *H04W 72/085* (2013.01); *H04B 7/0695* (2013.01); *H04B 7/088* (2013.01)

(58) Field of Classification Search
USPC ........................................................ 370/252
See application file for complete search history.

(56) References Cited

U.S. PATENT DOCUMENTS

2017/0346544 A1* 11/2017 Islam .................... H04B 7/0634
2018/0020363 A1* 1/2018 Faxer ...................... H04L 5/005
2018/0219605 A1 8/2018 Davydov et al.
2018/0279284 A1* 9/2018 Wang .................... H04W 72/14

FOREIGN PATENT DOCUMENTS

WO WO2017023231 A1 7/2015
WO WO-2018183995 A1 * 10/2018 .......... H04W 72/046

OTHER PUBLICATIONS

International Search Report and Written Opinion of International Search Authority for PCT/CN2018/096976 dated Oct. 12, 2018 (9 pages).
R1-1702674 3GPP TSG-RAN WG1 #88, Ericsson, "Beam management overview", Athens, Greece, Feb. 13-17, 2017 (6 pages).
R1-1711015 3GPP TSG-RAN Wg1 #89ah-NR, Ericsson, "On DL beam indication", Qingdao, China, Jun. 27-30, 2017 (8 pages).

* cited by examiner

METHOD FOR BEAM MANAGEMENT WITH BEAM INDICATION IN WIRELESS COMMUNICATION SYSTEMS WITH BEAMFORMING

CROSS REFERENCE TO RELATED APPLICATIONS

This application claims priority under 35 U.S.C. § 119 from U.S. Provisional Application No. 62/536,509, entitled "Method of Beam Indication," filed on Jul. 25, 2017; the subject matter of which is incorporated herein by reference.

TECHNICAL FIELD

The disclosed embodiments relate generally to wireless communication, and, more particularly, to beam management and beam indication in a Millimeter Wave (mmWave) beamforming system.

BACKGROUND

The bandwidth shortage increasingly experienced by mobile carriers has motivated the exploration of the under-utilized Millimeter Wave (mmWave) frequency spectrum between 3G and 300G Hz for the next generation broadband cellular communication networks. The available spectrum of mmWave band is hundreds of times greater than the conventional cellular system. The mmWave wireless network uses directional communications with narrow beams and can support multi-gigabit data rate. The underutilized bandwidth of the mmWave spectrum has wavelengths ranging from 1 mm to 100 mm. The very small wavelengths of the mmWave spectrum enable large number of miniaturized antennas to be placed in a small area. Such miniaturized antenna system can produce high beamforming gains through electrically steerable arrays generating directional transmissions.

With recent advances in mmWave semiconductor circuitry, mmWave wireless system has become a promising solution for real implementation. However, the heavy reliance on directional transmissions and the vulnerability of the propagation environment present particular challenges for the mmWave network. In general, a cellular network system is designed to achieve the following goals: 1) Serve many users with widely dynamical operation conditions simultaneously; 2) Robust to the dynamics in channel variation, traffic loading and different QoS requirement; and 3) Efficient utilization of resources such as bandwidth and power. Beamforming adds to the difficulty in achieving these goals.

In principle, beam management mechanism, which includes both initial beam alignment and subsequent beam tracking, ensures that base station (BS) beam and user equipment (UE) beam are aligned for data communication. In downlink (DL)-based beam management, the BS side provides opportunities for UE to measure beamformed channel of different combinations of BS beams and UE beams. For example, BS performs periodic beam sweeping with reference signal (RS) carried on individual BS beams. UE can collect beamformed channel state by using different UE beams and report the collected measurement results to BS. Different beam management procedures are designed to enable UE measurement for different objectives.

A beam indication (BI) mechanism is needed to provide the UE the information of network (NW) beam(s), i.e., spatial transmission filter(s), for later transmission, such that UE is able to decide its UE receive beam(s), i.e., spatial receive filter(s), for the later transmission based on the BI. The transmission that may need BI assistance includes reference signal (RS) transmission for measurement in beam management and channel state information (CSI) acquisition, control channel transmission, and data channel transmission. BI provides information that enables UE to determine how to receive NW transmissions for RS, for incoming control channel, and for incoming data channel.

SUMMARY

A beam indication (BI) mechanism is proposed to provide user equipment (UE) information of network (NW) beam(s) for later transmission. UE can then select its UE beam(s) for the later transmission based on the BI. In one embodiment, NW provides beam management configuration to UE via Radio Resource Control (RRC) signaling, and then provides beam indication index signaling to UE via MAC-CE or DCI. The beam management configuration comprises a mapping table between network beams and configured reference signal (RS) resources. The beam indication index signaling indicates one or more preferred beam pair links (BPLs). Upon triggering a beam management procedure by the network, UE is able to identify the beam management procedure and selects corresponding UE beam(s) based on the beam management configuration and the beam indication index signaling.

In one embodiment, a UE receives a beam management configuration in a beamforming wireless communication network. The beam management configuration comprises reference signal (RS) resources configurations for beam measurement, reporting configurations for beam measurement, and a mapping table between a list of beam indication index values and configured RS resources. The UE performs UE measurements in accordance with a UE measurement procedure by using a set of UE beams. The UE measurement procedure is determined based on the beam management configuration and whether or not a beam indication index signaling is received explicitly. The set of UE beams is determined based whether or not the beam indication index signaling is received explicitly.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
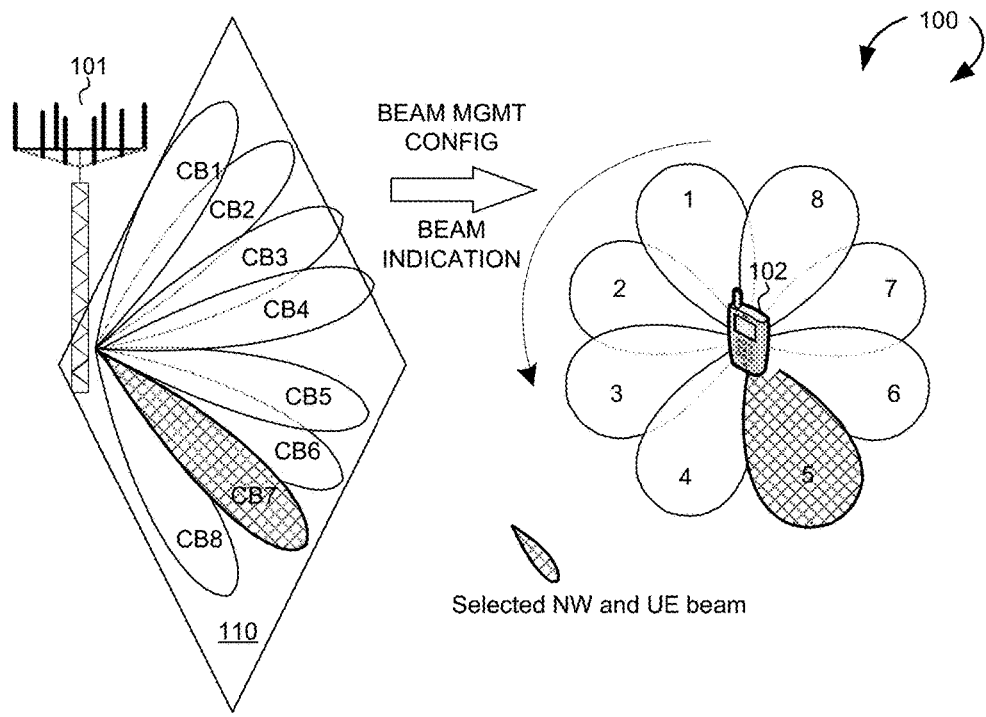
FIG. 1 illustrates a Millimeter Wave beamforming wireless communication system with beam management and beam indication in accordance with one novel aspect.

FIG. 1 illustrates a Millimeter Wave beamforming wireless communication system 100 with beam management and beam indication in accordance with one novel aspect. Beamforming mmWave mobile communication network 100 comprises a base station BS 101 and a user equipment UE 102. The mmWave cellular network uses directional communication with narrow beams and can support multi-gigabit data rate. Directional communication is achieved via digital and/or analog beamforming, wherein multiple antenna elements are applied with multiple sets of beamforming weights to form multiple beams. Different beamformers can have different spatial resolution, i.e., beamwidth. For example, a sector antenna can form beams having lower array gain but wider spatial coverage, while a beamforming antenna can have higher array gain but narrower spatial coverage. In the example of FIG. 1, BS 101 is directionally configured with multiple cells, and each cell is covered by a set of TX/RX beams. For example, cell 110 is covered by a set of eight control beams CB1-CB8. The collection of the BS control beams CB1-CB8 covers an entire service area of cell 110. Similarly, UE 102 may also apply beamforming to form multiple UE beams, e.g., #U1-#U8. In addition to coarse control beams, more refined narrow data beams can be formed between BS 101 and UE 102 for dedicated data communication.

For beamformed access, both ends of a link need to know which beamformers to use, e.g., a beam pair link (BPL). In downlink (DL)-based beam management, the BS side provides opportunities for UE to measure beamformed channel of different combinations of BS TX beams and UE RX beams. For example, BS performs periodic beam sweeping with reference signal (RS) carried on individual BS TX beams. UE can collect beamformed channel state by using different UE RX beams and report the measurement metric(s) to BS. The measurement metric(s) can be reference signal received power (RSRP) or channel state information (CSI), or both. Different beam management procedures are designed to enable UE measurement for different objectives. A beam indication (BI) from the network (NW) provides UE information of the NW beam(s) for later transmission. UE can then select its UE beam(s) based on the BI.

In according with one novel aspect, a beam indication (BI) mechanism is proposed to provide UE the information of NW beams for later transmission, such that UE is able to decide its UE beam(s) for the later transmission. The transmission that may need BI assistance includes reference signal (RS) transmission for measurement in beam management and channel state information (CSI) acquisition, control channel transmission, and data channel transmission. In one embodiment, BS 101 provides beam management configuration to UE 102 via Radio Resource Control (RRC) signaling, and then provides beam indication index to UE 102 via MAC-CE or DCI. The beam management configuration comprises a mapping table between network beams and configured reference signal (RS) resources. The beam indication index indicates one or more preferred beam pair links (BPLs). Upon triggering a beam management procedure, UE 102 is then able to identify a corresponding beam management procedure and selects UE beam(s) based on the beam indication index.

Figure 2:
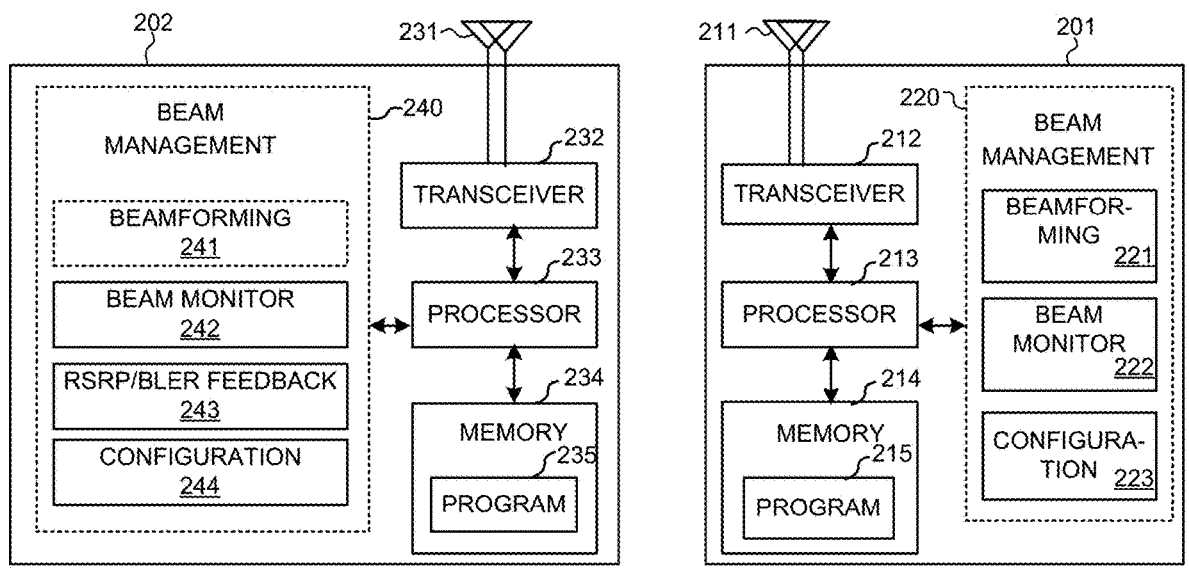
FIG. 2 is a simplified block diagram of a base station and a user equipment that carry out certain embodiments of the present invention.

FIG. 2 is a simplified block diagram of a base station and a user equipment that carry out certain embodiments of the present invention. BS 201 has an antenna array 211 having multiple antenna elements that transmits and receives radio signals, one or more RF transceiver modules 212, coupled with the antenna array, receives RF signals from antenna 211, converts them to baseband signal, and sends them to processor 213. RF transceiver 212 also converts received baseband signals from processor 213, converts them to RF signals, and sends out to antenna 211. Processor 213 processes the received baseband signals and invokes different functional modules to perform features in BS 201. Memory 214 stores program instructions and data 215 to control the operations of BS 201. BS 201 also includes multiple function modules and circuits that carry out different tasks in accordance with embodiments of the current invention.

Similarly, UE 202 has an antenna array 231, which transmits and receives radio signals. A RF transceiver module 232, coupled with the antenna, receives RF signals from antenna 231, converts them to baseband signals and sends them to processor 233. RF transceiver 232 also converts received baseband signals from processor 233, converts them to RF signals, and sends out to antenna 231. Processor 233 processes the received baseband signals and invokes different functional modules to perform features in UE 202. Memory 234 stores program instructions and data 235 to control the operations of UE 202. UE 202 also includes multiple function modules and circuits that carry out different tasks in accordance with embodiments of the current invention.

The functional modules and circuits can be implemented and configured by hardware, firmware, software, and any combination thereof. For example, BS 201 comprises a beam management module 220, which further comprises a beamforming circuit 221, a beam monitor 222, and a configuration circuit 223. Beamforming circuit 221 may belong to part of the RF chain, which applies various beamforming weights to multiple antenna elements of antenna 211 and thereby forming various beams. Beam monitor 222 monitors received radio signals and performs measurements of the radio signals over the various beams. Configuration circuit 223 configures radio resources and beam indication information for UE measurements and reporting behavior and data transmission.

Similarly, UE 202 comprises a beam management module 240, which further comprises a beamforming circuit 241, a beam monitor 242, a RSRP/BLER feedback circuit 243, a configuration circuit 244, and a PRACH/PUCCH handling circuit. Beamforming circuit 241 may belong to part of the RF chain, which applies various beamforming weights to multiple antenna elements of antenna 231 and thereby forming various beams. Beam monitor 242 monitors received radio signals and performs measurements of the radio signals over the various beams and maintains a ranking of its preferred BPLs. RSRP/BLER feedback circuit 243 provide beam quality feedback information to BS 201 for BPL alignment status determination. Configuration circuit 244 receives radio resources and beam indication information for UE measurements and reporting behavior and data transmission. In one embodiment, UE identifies a beam management procedure and performing measurement using the selected UE beam(s) based on the received beam management configuration and beam indication.

Figure 3:
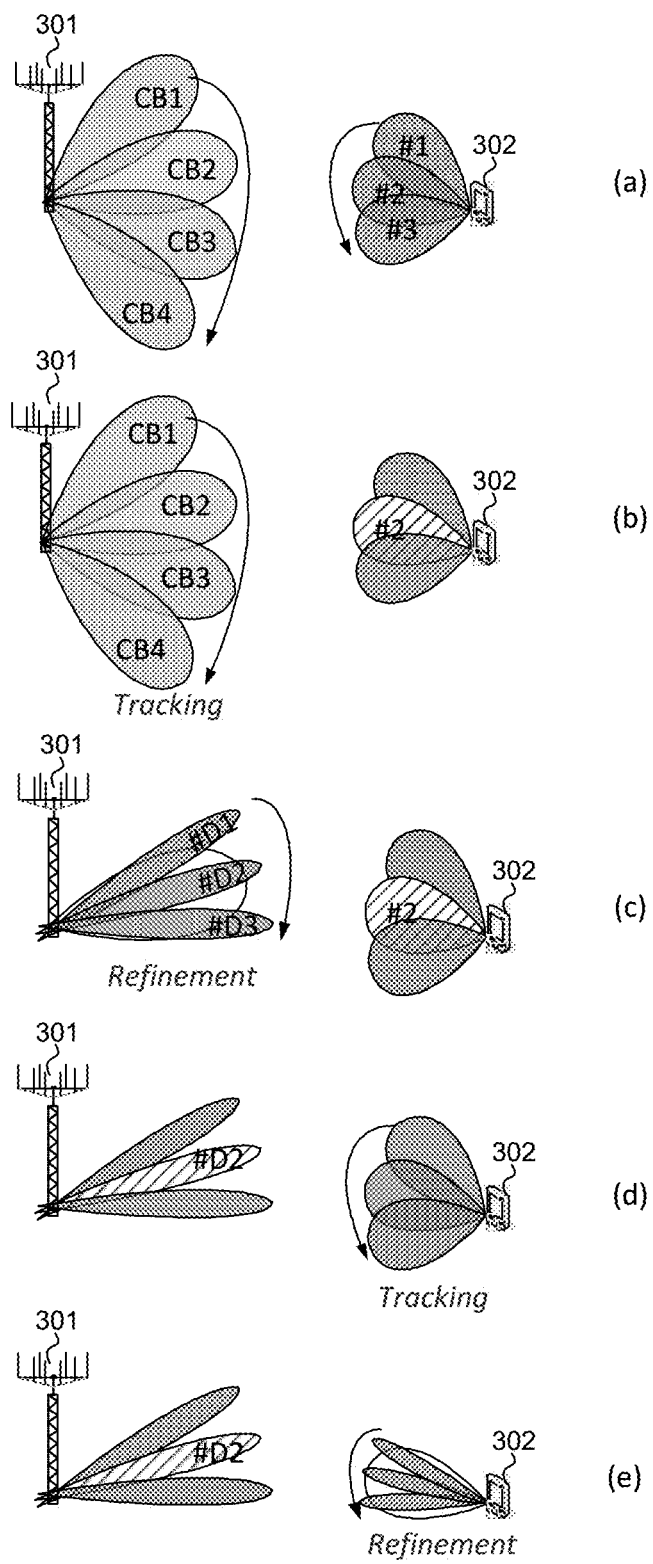
FIG. 3 illustrates different beam management procedures with beam indication in accordance with one novel aspect.

FIG. 3 illustrates different beam management procedures with beam indication in accordance with one novel aspect. A first UE measurement procedure involves coarse network beam selection and UE beam selection. As depicted by FIG. 3 (a), the first UE measurement procedure enables UE measurement on different transmission point (TRP) TX beams to support selection of TRP TX beams and UE RX beams. For beamforming at TRP 301, it typically includes an intra/inter-TRP TX beam sweep from a set of different control beams CB1-CB4. For beamforming at UE 302, it typically includes a UE RX beam sweep from a set of different beams #1-#3. A second UE measurement procedure involves network beam refinement where the UE performs measurements using a fixed UE beam over different network beams. As depicted by FIGS. 3 (b) and (c), the second UE measurement procedure enables UE 302 to measure on different TRP 301 coarse control beams CB1-CB4 and/or fine data beams #D1-#D3 based on NW configurations or implementation. For example, UE 302 uses a fixed UE beam #2 to help the selection of CB1-CB4 and/or #D1-#D3. A third UE measurement procedure involves UE beam refinement where the UE performs measurement using different UE beams over a fixed network beam. As depicted by FIGS. 3 (d) and (e), the third UE measurement procedure enables UE 302 to measure on the same TRP 301 TX beam #D2 to change UE RX beam in the case UE uses beamforming.

Figure 4:
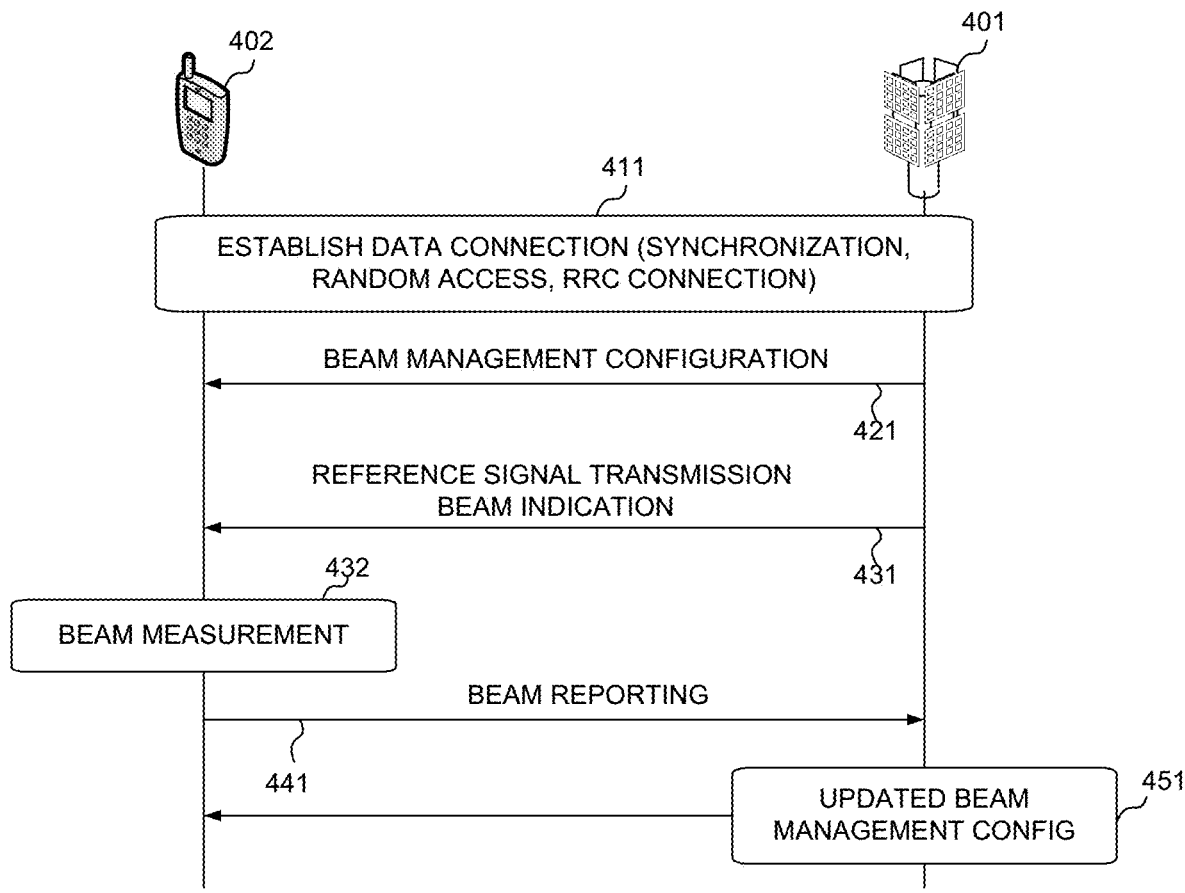
FIG. 4 illustrates a sequence flow of a beam management procedure with beam indication to facilitate UE measurements.

FIG. 4 illustrates a sequence flow of a beam management procedure with beam indication to facilitate UE measurements. BS 401 is directionally configured with multiple cells, and each cell is covered by a set of TX/RX control beams. Initially, UE 402 performs scanning, beam selection, and synchronization with BS 401 using the control beams, which include pre-defined or pre-configured sequences for UE to identify its existence. In step 411, BS 401 and UE 402 establish a data connection over a trained dedicated data beam based on a beam training operation (e.g., after performing synchronization, random access, and RRC connection establishment). In step 421, BS 401 provides beam management configuration to UE 402, e.g., via radio resource control (RRC) signaling. The beam management configuration comprises CSI-RS resource configuration, and a mapping table between network TX beams and RS resources, etc. In step 431, BS 401 performs beam management procedure based on the RRC configuration and transmits downlink reference signals to UE 402 using the configured RS resource and over the same or different TX beams. BS 401 also transmits beam indication information to UE 402. Based on the reference signal transmission and the beam indication information, UE 402 performs corresponding measurements on the transmissions for its RSRP and/or CSI metric (step 432). In step 441, UE 402 transmits beam report to BS 401. In step 451, BS 401 sends an updated beam management configuration to UE 402 when the mapping between network TX beams and the configured RS resources is changed.

Figure 5:
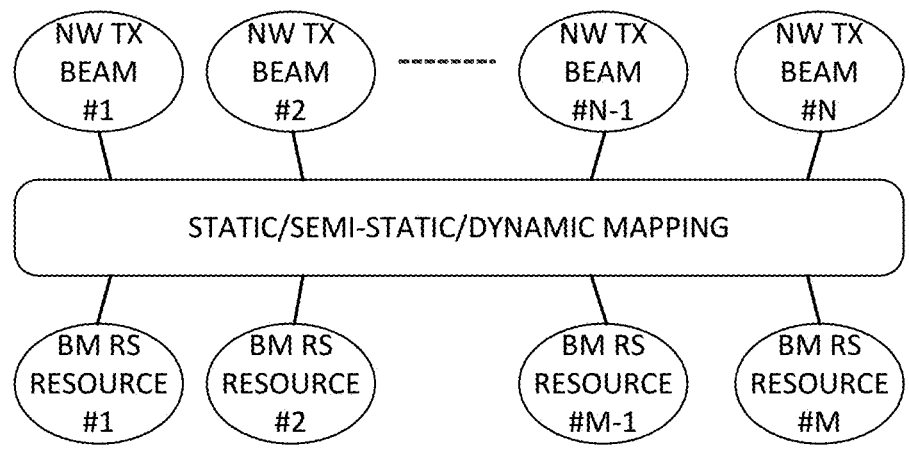
FIG. 5 illustrates a mapping relationship between network TX beams and beam management reference signal (RS) resources.

FIG. 5 illustrates a mapping relationship between network TX beams and beam management reference signal resources. The mapping between network TX beams and RS resources can be static or semi-static or dynamic. When performing measurements, UE knows when UE beams can be swept and when UE beams should not be swept. In order to do that, UE need to identify whether the network-triggered beam management procedure is a first procedure of selection of NW TX beams and UE RX beams, or a second procedure of NW TX beam refinement, or a third procedure of UE beam refinement. For the first procedure, a periodic beam RS resource set can be configured, and other signaling may not be needed for triggering the transmission and reporting. In one embodiment, beam indication index is not provided for guiding UE receive beam selection. Instead, UE determines UE receive beam by itself. The periodic beam RS resource set repetition pattern can be given by RRC configuration. In another embodiment of the first procedure, a same reference signal resource in different transmission periods has same transmit beam, i.e., same spatial transmit filter characteristics. For the second procedure of network TX beam refinement, a beam indication index can be signaled when the procedure is configured via RRC, which helps the UE to determine which UE receive beam should be used for the TX beam refinement. The beam indication can be signaled via downlink control information (DCI) over a control channel. If a beam measurement reference signal set associated with the second procedure needs to be activated by a MAC control element (CE) before usage/measurement, the beam indication index can be carried together with the MAC CE for activating the beam measurement reference signal set.

For the third procedure of UE RX beam refinement, UE is allowed to sweep UE beams. A resource configuration via RRC can include a field to explicitly indicate whether this is the third procedure or not. Alternatively, since the third procedure may not be associated with beam reporting (i.e., no beam reporting after measurements for the third procedure), the third procedure thus can be identified implicitly during configuration or upon triggering. If signaled explicitly, a beam indication index can be signaled to assist the UE RX beam selection for measurement, at least when multiple beam pair links are maintained. For example, the UE can select neighboring beams of the beam indication index-indicated UE beam. Similar approaches as for signaling the beam indication index for the second procedure can be applicable for the third procedure as well. The beam indication index can also be avoided and UE can search over its UE RX beam space, based on UE implementation, for measurements. Information related to UE RX beam capability is beneficial for the network to decide the third procedure repetition pattern similar to the first procedure.

Figure 6:
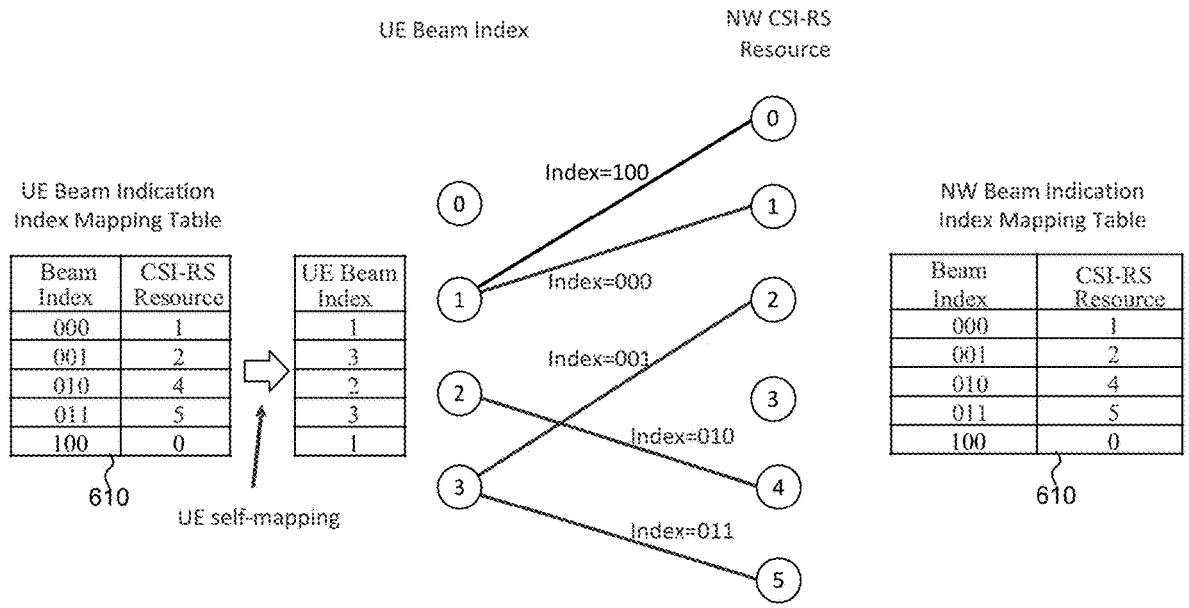
FIG. 6 illustrates examples of beam indication and its relationship with RS resources.

FIG. 6 illustrates examples of beam indication indexes and its relationship with RS resources. In general, beam indication indexes are mapped to RS resource sets, which are configured for beam management procedures via RRC signaling. The beam indication index provides spatial quasi-co-location (QCL) information. From UE perspective, the beam indication index informs UE to relate its reception with a previous measurement or report experience. For example, the beam indication index can be used to associate corresponding RS transmission with a previous measurement or used to associate corresponding RS measurement with a previous report. From NW perspective, the beam indication index relates a NW transmission with a previous NW transmission experience. A beam indication index value is a shortened representation of RS resource indication in UE's measurement report. The beam indication index assures an anchoring behavior in a way that if UE can receive a previous transmission indicated by the beam indication index, then UE can assume the same receiving method for new transmission associated with the beam indication index.

In the example of FIG. 6, the network provides a mapping table 610 of TX beam index and CSI-RS resource to the UE, and the UE maps the TX beam index and the CSI-RS resource to a corresponding UE beam index. As a result, based on the beam-related reporting, preferred NW TX beams and BPLs are selected as potential links for communicating with the UE. UE report indicates RS measurements with preferred radio signal strength. The report indicates a subset of RS resources by e.g. resource indexes, and the network can map the reported RS resources back to the NW TX beams used for transmitting on the reported RS resources. The selected links are tagged with the beam indication index values. In principle, the entire mapping table 610 is signaled by RRC during beam management configuration. Then, beam indication index is signaled by the network when individual beam management procedure is triggered. In essence, the beam indication index creates an association between the selected links and beam indication index values, and such association signaling can appear as RRC, MAC-CE, or both RRC and MAC-CE.

When beam indication indexes are used for multi-beam indication, the beam indication indexes can be signaled in the form of a bitmap. For example, the first bit indicates the on/off state of the first beam indication index, etc. The beam indication indexes can be linked to group-based beam report when configuring group-based beam reporting. For example, the network can associate a beam indication index per beam group or associate a beam indication index to particular position in the group-based beam report, e.g., associate the first beam in each group to a beam indication index.

Figure 7:
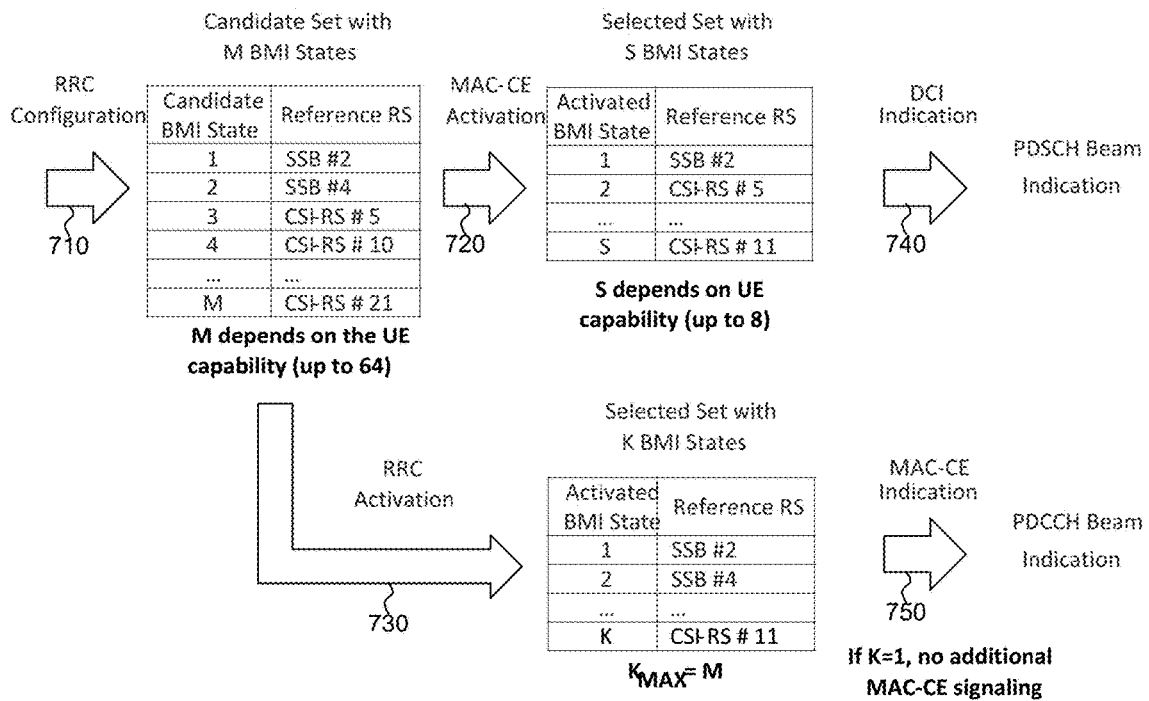
FIG. 7 illustrates examples of providing beam indication table and activating beam indication through the use of RRC, MAC-CE, and DCI.

FIG. 7 illustrates examples of providing beam indication table and activating beam indication through the use of RRC, MAC-CE, and DCI. During the beam management configuration, the entire beam indication and RS resource mapping table is signaled to UE via RRC configuration as depicted by arrow 710. In the mapping table, each candidate beam indication index is mapped to a RS resource set that is configured as a corresponding SSB or CSI-RS. In a first option, a selected subset of beam indication indexes may then be activated via MAC-CE activation as depicted by arrow 720. The MAC-CE can be used to activate or deactivate a subset of beam pair links for control channel monitoring purpose. Each individual beam indication index can then be signaled via a DCI field for PDSCH beam indication as depicted by arrow 740. The DCI field of the control channel can be used to indicate at least a beam pair link that will be used for transmitting a data channel corresponding to the control channel. In a second option, a selected subset of beam indication indexes may then be activated via RRC activation as depicted by arrow 730. Each individual beam indication index can be signaled via a MAC-CE for PDCCH beam indication as depicted by arrow 750. The MAC-CE can be used to indicate at least a beam pair link for control channel monitoring. If only one beam index is activated, then no additional MAC-CE signaling is needed.

Figure 8:
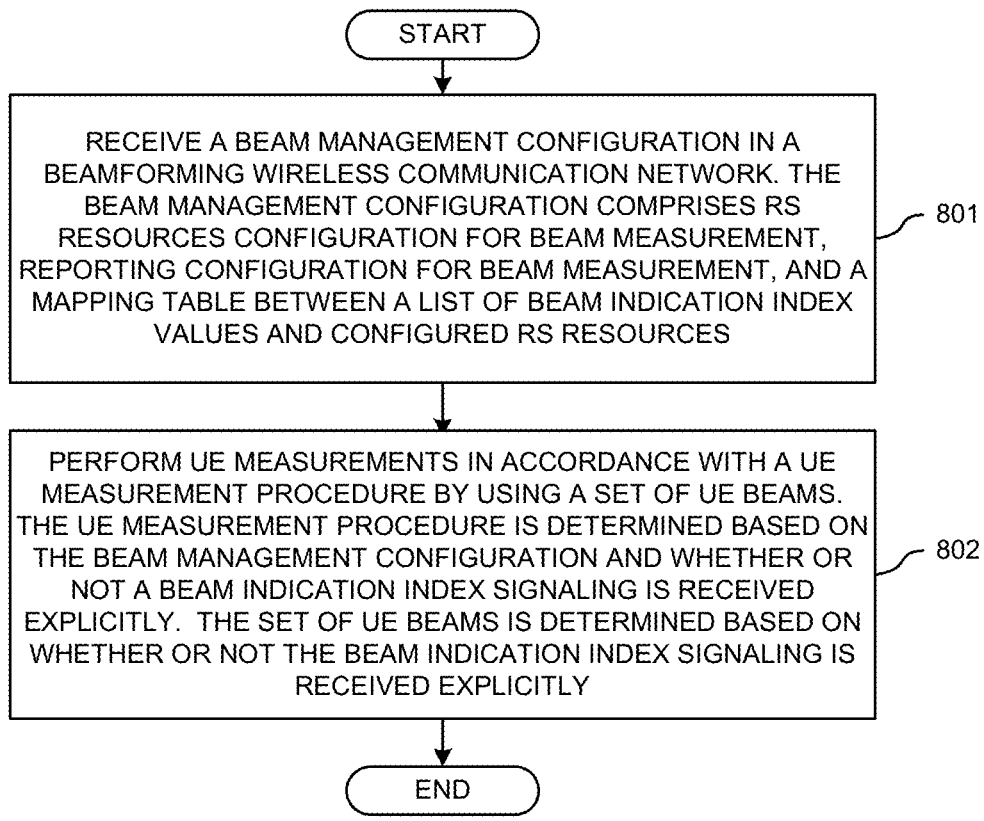
FIG. 8 is a flow chart of a method of beam indication for beam management from UE perspective in accordance with one novel aspect.

FIG. 8 is a flow chart of a method of beam indication for beam management from UE perspective in accordance with one novel aspect. In step 801, a UE receives a beam management configuration by a user equipment (UE) in a beamforming wireless communication network. The beam management configuration comprises reference signal (RS) resources configurations for beam measurement, reporting configurations for beam measurement, and a mapping table between a list of beam indication index values and configured RS resources. In step 802, the UE performs UE measurements in accordance with a UE measurement procedure by using a set of UE beams. The UE measurement procedure is determined based on the beam management configuration and whether or not a beam indication index signaling is received explicitly. The set of UE beams is determined based whether or not the beam indication index signaling is received explicitly. In one example, the beam indication index signaling comprises one or more beam indication index(es) indicating one or more beam pair links to be used as spatial filtering reference for subsequent beam measurements. The mapping table provides corresponding RS resources of the one or more beam indication index(es).

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
receiving a beam management configuration by a user equipment (UE) in a beamforming wireless communication network, wherein the beam management configuration is sent from a base station and comprises reference signal (RS) resources configurations for beam measurement, reporting configurations for beam measurement, and a mapping table between a list of beam indication index values and configured RS resources from the RS resource configurations for beam measurement;
determining whether the UE receives a beam indication index signaling from the base station, wherein the beam indication index signaling comprises a first beam indication index for a first RS resource in the configured RS resources; and
performing UE measurements on the first RS resource in accordance with a UE measurement procedure by using a UE beam, wherein the UE measurement procedure is determined based on the beam management configuration and whether or not the first beam indication index is received for the first RS resource, and wherein
the UE beam is determined from the first beam indication index for performing the UE measurements on the first RS resource, wherein the first beam indication index is from the list of beam indication index values in the mapping table, and
otherwise, the UE beam is determined by the UE for performing the UE measurements on the first RS resource when the first beam indication index is not received.

2. The method of claim 1, wherein the beam indication index signaling comprises one or more beam indication index(es) indicating one or more beam pair links to be used as spatial filtering reference for subsequent beam measurements, wherein the mapping table provides corresponding RS resources of the one or more beam indication index(es).

3. The method of claim 1, wherein the beam indication index signaling is received via a downlink control information for a data channel transmission.

4. The method of claim 1, wherein the beam indication index signaling is received via a MAC control element, wherein the MAC control element also activates a beam measurement reference signal set to which the beam indication index applies.

5. The method of claim 1, wherein the UE identifies a first UE measurement procedure based on periodically configured reference signal resources and an absence of the beam indication index signaling.

6. The method of claim 1, wherein a second UE measurement procedure involves network beam selection operation where the set of UE beams contains a fixed UE beam for measurement of different reference signal resources.

7. The method of claim 6, wherein the second UE measurement procedure is identified when the beam indication index is signaled to the UE for determining the fixed UE beam.

8. The method of claim 1, wherein a third UE measurement procedure involves UE beam selection operation where the UE performs measurement using different UE beams over a fixed network beam.

9. The method of claim 8, wherein the third UE measurement procedure is identified when the reference signals resources configurations for beam measurement include an explicit indication that the reference signals resources in the configurations are transmitted with a same spatial filtering characteristic.

10. The method of claim 8, wherein the reference signals resources configurations for beam measurement for the third UE measurement procedure includes the explicit beam indication index signaling to help determining the different UE beams.

11. A user equipment (UE), comprising:
a receiver that receives a beam management configuration in a beamforming wireless communication network, wherein the beam management configuration is sent from a base station and comprises reference signal (RS) resources configurations for beam measurement, reporting configurations for beam measurement, and a mapping table between a list of beam indication index values and configured RS resources from the RS resource configurations for beam measurement;
a processor that is configured to determines whether the UE receives a beam indication index signaling from the base station, wherein the beam indication index signaling comprises a first beam indication index for a first RS resource in the configured RS resources; and
a monitoring circuit that performs UE measurements on the first RS resource in accordance with a UE measurement procedure by using a set of UE beams, wherein the UE measurement procedure is determined based on the beam management configuration and whether or not the first beam indication index is received for the first RS resource, and wherein the set of UE beams is determined from the first beam indication index for performing the UE measurements on the first RS resource, wherein the first beam indication index is from the list of beam indication index values in the mapping table, indicating one or more beam pair links for subsequent beam measurements, and otherwise the set of UE beams is determined by the UE for performing the UE measurements on the first RS resource when the first beam indication index is not received.

12. The UE of claim 11, wherein the beam indication index signaling comprises one or more beam indication index(es) indicating one or more beam pair links to be used as spatial filtering reference for subsequent beam measurements, wherein the mapping table provides corresponding RS resources of the one or more beam indication index(es).

13. The UE of claim 11, wherein the beam indication index signaling is received via a downlink control information for a data channel transmission.

14. The UE of claim 11, wherein the beam indication index signaling is received via a MAC control element, wherein the MAC control element also activates a beam measurement reference signal set to which the beam indication index applies.

15. The UE of claim 11, wherein a configuration circuit of the UE identifies a first UE measurement procedure based on periodically configured reference signal resources and an absence of the beam indication index signaling.

16. The UE of claim 11, wherein a second UE measurement procedure involves UE using a fixed UE beam where the set of UE beams contains the fixed UE beam for measurement of different reference signal resources.

17. The UE of claim 16, wherein the second UE measurement procedure is identified by a configuration circuit of the UE when the beam indication index is signaled to the UE for determining the fixed UE beam.

18. The UE of claim 11, wherein a third UE measurement procedure involves UE beam selection operation performed by a configuration circuit of the UE where the UE performs measurement using different UE beams over a fixed network beam.

19. The UE of claim 18, wherein the third UE measurement procedure is identified by the configuration circuit of the UE when the reference signals resources configurations for beam measurement include an explicit indication that the reference signals resources in the configurations are transmitted with a same spatial filtering characteristic.

20. The UE of claim 18, wherein the reference signals resources configurations for beam measurement for the third UE measurement procedure includes the explicit beam indication index signaling to help determining the different UE beams.

* * * * *